Jan. 3, 1961 H. R. WENGEN 2,966,817
ELECTRICAL CABLE CLAMP-APPLYING TOOL
Filed March 27, 1959 3 Sheets-Sheet 1

INVENTOR.
HENRY R. WENGEN
BY
Kane, Dalsimer and Kane
ATTORNEYS

Jan. 3, 1961 H. R. WENGEN 2,966,817
ELECTRICAL CABLE CLAMP-APPLYING TOOL
Filed March 27, 1959 3 Sheets-Sheet 2

INVENTOR.
HENRY R. WENGEN
BY
Kane, Dalimier and Kane
ATTORNEYS

Jan. 3, 1961    H. R. WENGEN    2,966,817
ELECTRICAL CABLE CLAMP-APPLYING TOOL
Filed March 27, 1959    3 Sheets-Sheet 3
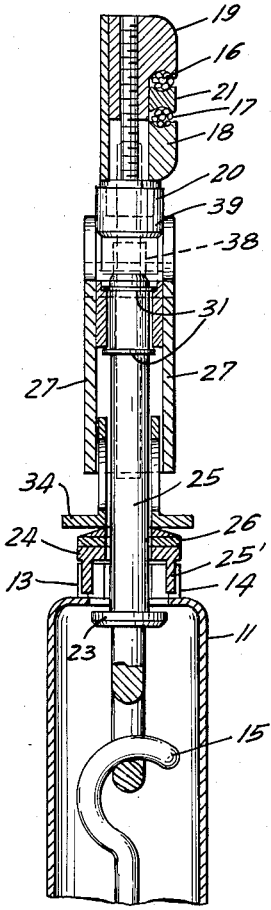
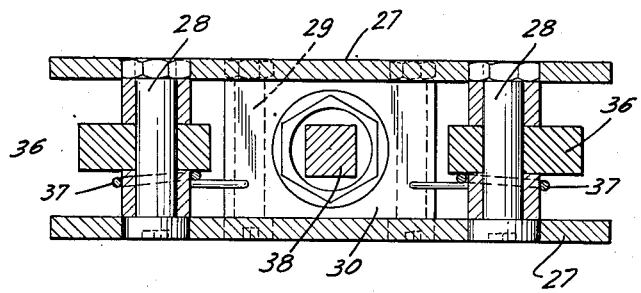
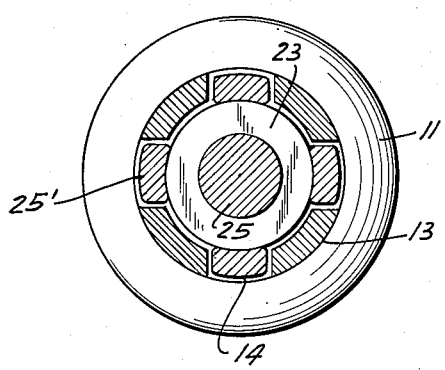
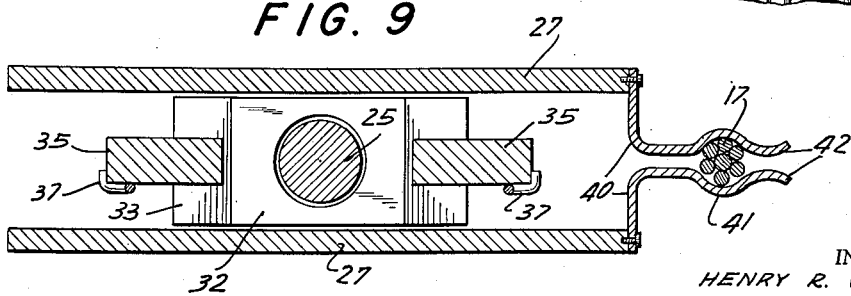
INVENTOR.
HENRY R. WENGEN,
BY
Kane, Dalsimer and Kane
ATTORNEYS

United States Patent Office 2,966,817
Patented Jan. 3, 1961

2,966,817
ELECTRICAL CABLE CLAMP-APPLYING TOOL

Henry R. Wengen, Poughkeepsie, N.Y., assignor to Fargo Mfg. Company, Inc., Poughkeepsie, N.Y., a corporation of New York Filed Mar. 27, 1959, Ser. No. 802,548

4 Claims. (Cl. 81—53)

This invention relates to a structurally and functionally improved tool for applying clamps of the type shown in United States Patent 2,858,522 to Wengen et al., dated October 28, 1958, to an electrical cable or wire for the purpose of providing in an improved manner a tap-off or lead-in for that cable.

A primary object of the invention is that of furnishing a tool which may be manipulated by a linesman or electrician to efficiently produce the desired results and without danger to that user, despite the fact that the cable or wire involved may carry a high electrical potential.

A further object is that of furnishing an improved tool which may be quickly and efficiently applied to a clamp, for the purpose of either mounting or removing the same. So applied, it will be capable of manipulation to readily effect the desired end result with minimum effort and skill, while at the same time assuring an efficient form of electrical connection between the wires or cables involved. This connection will be maintained without deterioration for practically the entire life of the installation, despite adverse wind and weather conditions and stresses and strains to which the wires or cables are otherwise subjected.

An additional object is that of designing a tool which may function as an attachment to a standard operating implement as heretofore marketed, but which implement is incapable of efficiently applying and removing clamps of the type afore referred to. While the tool of the present invention may thus serve as an attachment, it is to be understood that the teachings herein are not to be limited to an accessory unit, except as otherwise indicated by the claims.

Among other objects is that of furnishing a tool which will include relatively few parts, each individually simple and rugged in construction, and all capable of ready assembly to furnish a unitary device operating over long peroids of time with freedom from all difficulties.

With these and other objects in mind, reference is had to the attached sheets of drawings illustrating one practical embodiment of the invention, and in which.

Figure 4:
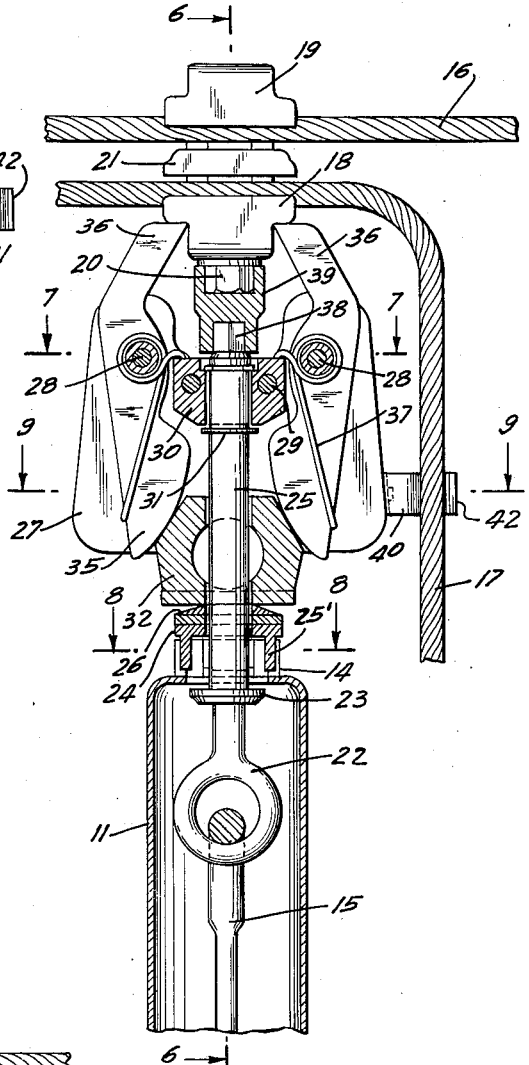
Fig. 4 is a partially sectional view that correspondingly illustrates the position of the parts during the application of a clamp to a cable or wire.

Fig. 6 is a sectional side view of the assembly taken along the line 6—6 in the direction of the arrows as indicated in Fig. 4; and Figs. 7, 8 and 9 are transverse sectional views taken respectively along the lines 7—7, 8—8 and 9—9 in the direction of the arrows as also indicated in Fig. 4.

Figure 1:
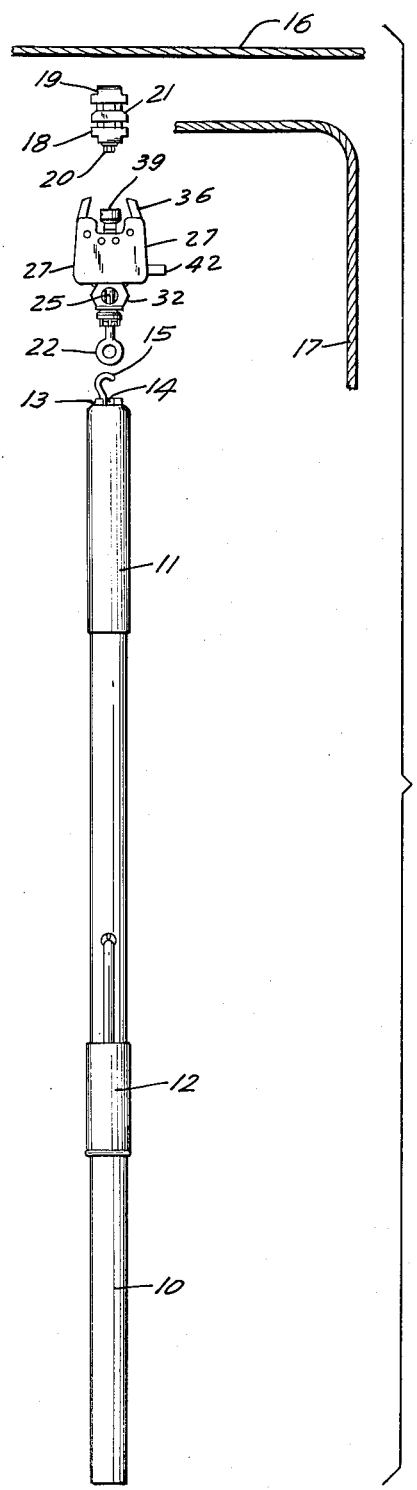
Fig. 1 is an exploded or separated view of the assembly and showing the present tool as an attachment to an operating implement.
Figure 2:
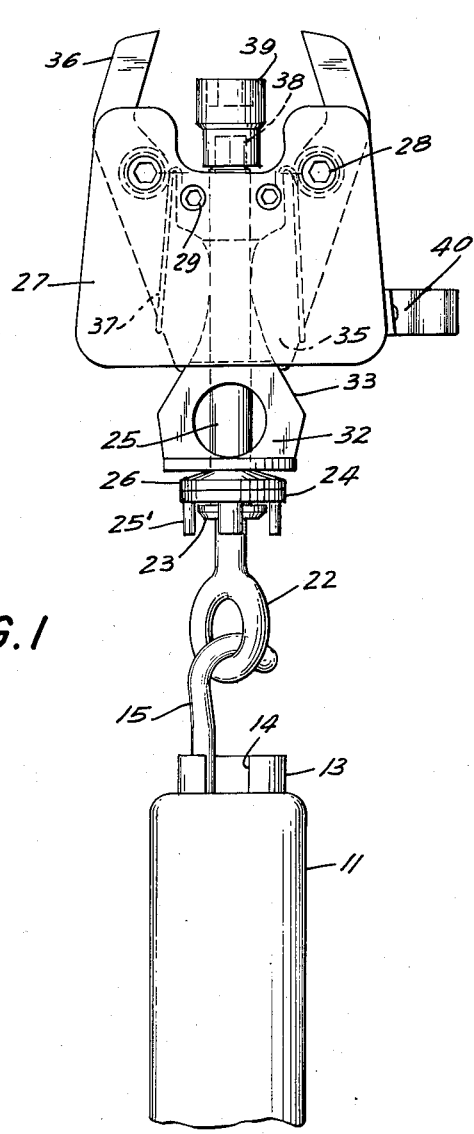
Fig. 2 is a side elevation of the tool as illustrated in Fig. 1 and showing the same in initial association with a manipulating implement of standard design.

Referring primarily to Fig. 1, there has been indicated at 10 a pole or handle conveniently providing at its upper end a ferrule 11. Slidably mounted upon this handle is a sleeve 12. At the outer end of the handle a head 13 is mounted which may be integral with ferrule 11 and is provided with a notch 14 (Fig. 2). The pole or handle 10 is formed of a material having high dielectric properties. Extending outwardly of the flange or head 13 is a hook-shaped manipulating element 15. By means of suitable mechanism (not illustrated) sleeve 12 is operatively connected to hook 15, so that the latter may be retracted into ferrule 11 and/or the interior of pole 10. By a reverse operation of the parts, the manipulating element 15 may be projected to occupy a position as shown in Fig. 1. The operative coupling between that element and sleeve 12 or its equivalent may involve any desired mechanism which will assure against an electrically conductive path extending through to the sleeve.

Implements of this type are known as "hot-line" sticks or "shotgun" sticks. Various alternative forms have been marketed. One practical assembly is illustrated in the United States patent to Johnson 2,095,137 of October 5, 1937, entitled "Operating Implement for Hot-Line Clamps." The hook or manipulating element of that implement is ideally adapted for association with the head portion or ring 26 of the bolt 25 as shown in the United States patent to Becker 2,811,703 of October 29, 1957, on "Line Clamp." Thus, a clamp of that type to connect a tap-off or lead-in wire with an electrical cable may readily be attached to or detached from the cable.

However, when one is confronted with the problem of connecting a tap-off or lead-in cable or wire 17 with a current-carrying cable 16 by means of a clamp such as is shown in the United States patent to Wengen et al. 2,858,522 of October 28, 1958, the implement as illustrated in Fig. 1 and in the aforementioned Johnson patent is unsuitable. Such a clamp has been generally indicated in Figs. 1, 5 and 6 as including a body which embraces a jaw 18, a jaw 19 movably supported by that body, and the head 20 of a bolt for shifting jaw 19 toward and away from jaw 18. A divider or separator 21 has also been illustrated which is slidably supported by the body and serves to maintain cables or wires 16 and 17 out of physical contact. While this segregation is in some ways desirable, it is of course not essential, and the clamp may accordingly involve a modified structure, if desired.

By means of the present teachings, a tool is furnished which will enable a linesman to readily and properly operate a clamp of the type illustrated in the Wengen et al. patent to electrically couple and support one lead or cable with respect to another or to permit a detachment of those leads or cables. In the interest of economy, the tool may serve as an attachmtnt to a more or less standard "shotgun" stick. As afore brought out, however, it may, if desired, form a permanent part of that stick, and thus provide a completely novel assembly. With the foregoing in mind, reference is had to the preferred embodiment of the tool, as illustrated in Fig. 2 et seq.

Thus, in those views the numeral 22 indicates the head of the tool assembly, which is preferably in the form of an eye, extending from the shank of a bolt mounting a flange 23. The bolt is rotatably encircled by a disk 24 having inwardly projecting pins or projections 25'. These are disposable within the notches 14 of the head or flange 13. The shank of the bolt has been indicated by the numeral 25, and also rotatably mounts a spring washer assembly 26. Beyond this point, the bolt extends into a base assembly.

As illustrated especially in Figs. 6, 7 and 9, the base is conveniently provided by a pair of plates 27 maintained against movement with respect to each other by, for example, a pair of transverse bolts 28. These plates are secured in properly spaced relationship by means of a base element 30 through which further bolts 29 extend to secure the parts against detachment from each other. Retaining elements such as C-washers 31 conveniently project into grooves formed in the shank of bolt 25 and bear against the upper and lower faces of base 30. Thus, axial movement of the bolt with respect to the base 30 and plates 27 is prevented, although free relative rotation of the parts will occur.

Figure 3:
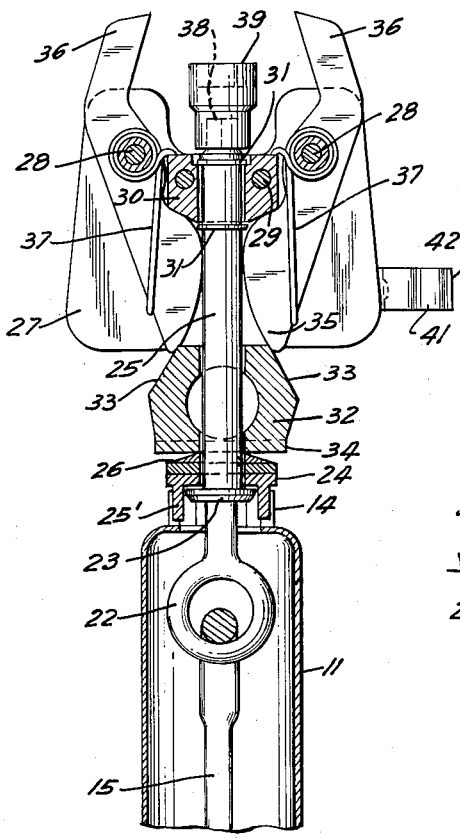
Fig. 3 is a similar partially sectional view of the tool after it has been shifted to an operating position with respect to the implement.

Rotatably supported upon the shank 25 of the bolt is an element 32 presenting cam faces 33 (Figs. 3 and 4). This element is provided with a base flange 34 bearing against the resilient washer assembly 26. Its length and width are such that it extends in overlapping relationship with the inner edges of plates 27 and into the space existing between them. So extended, it engages with follower portions 35 which form parts of levers pivotally mounted by the bolts 28 or their equivalents and the outer ends of which furnish jaws 36. The parts are so proportioned that with these jaws separated a maximum distance, there may readily be accommodated therebetween the base portion or body 18 of the clamp.

Now, with a view to urging those jaws to assume such a separated condition, springs 37 are preferably coiled around the pivot pins or bolts 28, and each has one of its ends bearing against the outer edge of one of the followers 35. Their opposite ends conveniently bear against the base 30. Therefore, the followers are urged toward each other and consequently into contact with the cam faces 33. Thus, element or member 32 will be retained against sliding movements axially of the bolt 25 and will constantly be in a position to control the swinging of followers 35. The outer end of bolt 25 conveniently terminates in a non-circular portion 38 which mounts the base of a socket wrench 39. As is apparent, that wrench may be replaced by similar units of diverse sizes, according to the needs of any given installation.

Finally, with regard to the assembly, it is preferred that a lead-retaining structure be provided to enable a workman to have both hands free to manipulate the pole or stick 10 without fear of the lead detaching from the assembly. The upper end of the lead-in or tap-off 17 will customarily include a laterally extending portion. This is disposed in association with the clamp. To retain the lead, any suitable structure may be utilized. Conveniently, and as especially shown in Figs. 2, 3, 4 and 9, a pair of strips 40 may be suitably attached to the edges of plates 27. These strips will include bulged or bowed portions 41 terminating in outwardly extending arms 42 to provide a clip. As is apparent, lead 17 may—after association with the clamp—be received within and temporarily retained between the bowed portions 41, thus overcoming any difficulties incident to the lead being displaced. If desired, any suitable clip-adjusting or tensioning structure may be associated with the parts to assure firm engagement between the clip arms and the lead.

In the use of the apparatus, the spring washer 26, which is preferably of the "Belleville" type, assures a firm engagement between cam element 32 and follower portions 35. This results because it will thrust through disk 24 against shoulder 23 of the bolt 25. A proper size socket 39 is applied to the end 38 of the shaft or bolt 25. Hook 15 is engaged with the loop 22 or its equivalent. Now, by manipulating sleeve 12 or other structure forming a part of the stick assembly, the parts are shifted from the position shown in Figs. 1 and 2 to that illustrated in Fig. 3. In the latter position, the projecting portions 25' are lodged within notches 14. The followers 35 of the levers providing the jaws 36 are in engagement with the cam surfaces 33. A suitable clamp is selected and has its bolt head 20 disposed within socket 39 and with the side edges of its body between the jaws 36. Now, by effecting relative turning of the head 20 with respect to the jaws 36, the parts of the clamp may be tightened.

Prior to such tightening, a lead as identified by the element 17 may have had its outer end disposed between jaw 18 of the clamp and the divider 21 thereof, as shown in Fig. 4. Also, that lead may have been engaged with the retaining structure provided by the clips or bulged portions 41. The user will now elevate the pole to cause cable 16 to lie within the space defined between jaw 19 and divider 21. Hook 15 or its equivalent will have been shifted from the position shown in Fig. 3 to that illustrated in Fig. 4, so that the body of the clamp is firmly gripped and no fear need be felt of its accidentally becoming detached from the tool. Now, by turning stick 10, wrench 39 will be rotated to turn head 20 and the threaded shank of the bolt extending therefrom. The threads of that shank, engaging with the bore of jaw 19, will draw the latter toward jaw 18. This operation of the parts will be continued until firm physical and electrical engagement exists between cable 16, lead 17, the surfaces of jaws 18 and 19 and divider 21 (if the latter is used). Thus, a permanent coupling will be furnished.

Figure 5:
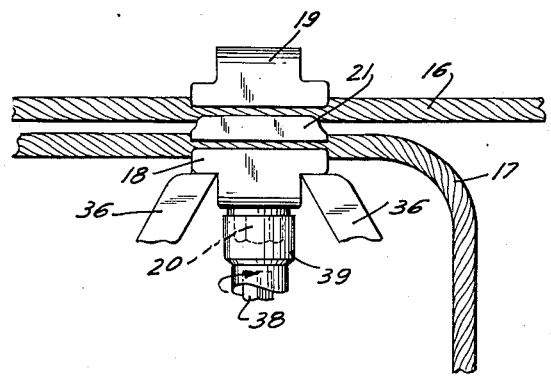
Fig. 5 is a fragmentary side elevation of certain of the tool parts during the final stages of application of the clamp.

Now, by shifting manipulating part 12, the elements of the mechanism are released to move from the positions shown in Figs. 4, 5 and 6 to the position illustrated in Fig. 3. This will free jaws 36 from gripping engagement with the body of the clamp. By swinging the tool, lead 17 will be detached from the clip structure provided by the strips 40. The tool is withdrawn and the mechanism shifted to the position shown in Fig. 2.

Thus, among others, the several objects of the invention as specifically aforenoted are achieved. Obviously, numerous changes in construction and rearrangements of the parts may be resorted to without departing from the spirit of the invention as defined by the claims.

I claim:
1. A clamp-applying tool including in combination a rotatable bolt, a part at one end of said bolt to be detachably engaged by a rotatable and reciprocable manipulating element supported by a handle having a notched head lying adjacent said element, a disk rotatably supported by said bolt beyond said part, a projection extending from said disk in the direction of said part to lie within the notch as said element is caused to engage said bolt part and draw said disk toward said head, a cam member rotatably encircling said bolt forward of and adjacent said disk, both said cam member and disk being shiftable axially of said bolt, a base also rotatably encircling said bolt at a point forward of said cam member, means for preventing movement of said base axially of said bolt, a pair of clamp-gripping jaws pivotally supported by said base, followers connected to move with said jaws and engaging the cam surfaces of said cam member and a wrench mounted on said bolt at the end opposite said part and at a point between said jaws.

2. In a tool as defined in claim 1, said disk and cam member being spaced from each other and a spring interposed therebetween.

3. In a tool as defined in claim 1, springs disposed adjacent the points of pivotal support of said jaws, one end of each spring bearing against said base and the opposite ends of said springs bearing against said followers to maintain the latter in operative contact with the cam surfaces of said cam member.

4. In a tool as defined in claim 1, a pair of plates connected to said base at spaced points to enclose at least one of said followers, a resilient clip mounted on said plates and extending outwardly from the enclosed follower and said clip receiving a tap-off cable to be detached therefrom by lateral movement of the handle.

References Cited in the file of this patent
UNITED STATES PATENTS

| | | |
|---|---|---|
| 1,489,377 | Wood et al. | Apr. 8, 1924 |
| 2,002,981 | Halladay | May 28, 1935 |
| 2,269,921 | Smith | Jan. 13, 1942 |
| 2,352,686 | Broadbooks | July 4, 1944 |